(12) United States Patent
Venkatesha et al.

(10) Patent No.: US 9,696,210 B2
(45) Date of Patent: *Jul. 4, 2017

(54) EXTENDED TEMPERATURE RANGE MAPPING PROCESS OF A FURNACE ENCLOSURE USING VARIOUS DEVICE SETTINGS

(71) Applicant: Honeywell International Inc., Morristown, NJ (US)

(72) Inventors: Sharath Venkatesha, Minnetonka, MN (US); Kwong W. Au, Bloomington, IL (US); Stefano Bietto, Tulsa, OK (US)

(73) Assignee: Honeywell International Inc., Morristown, NJ (US)

( * ) Notice: Subject to any disclaimer, the term of this patent is extended or adjusted under 35 U.S.C. 154(b) by 491 days.

This patent is subject to a terminal disclaimer.

(21) Appl. No.: 14/306,063

(22) Filed: Jun. 16, 2014

(65) Prior Publication Data
US 2015/0362372 A1    Dec. 17, 2015

(51) Int. Cl.
*G01J 5/00*   (2006.01)
*G01J 5/10*   (2006.01)
(Continued)

(52) U.S. Cl.
CPC .............. *G01J 5/0044* (2013.01); *G01J 5/602* (2013.01); *G06T 5/005* (2013.01); *G06T 5/008* (2013.01);
(Continued)

(58) Field of Classification Search
CPC .. G01J 5/0044; G01J 5/602; G01J 5/10; G01J 2005/0077; G01J 2005/0048;
(Continued)

(56) References Cited

U.S. PATENT DOCUMENTS 4,750,139 A * 6/1988 Dils ........................ G01J 5/08
                                                                250/227.23
5,109,277 A * 4/1992 James .................. G01J 5/0044
                                                                348/165
(Continued)

FOREIGN PATENT DOCUMENTS

GB       2361371 A    10/2001
WO   WO 2011/004396 A1   1/2011

OTHER PUBLICATIONS

"ThermoPro™ TP8" AMETEK Company, Product brochure—thermal imaging camera, Copyright © 2007, Land Instruments International.

*Primary Examiner* — John Lee

(57) ABSTRACT

A process is provided for mapping temperatures in an enclosure during a combustion process. A device setting of an image-capturing device is provided. An intensity-temperature mapping is generated by performing an intensity-temperature calibration based on an intensity of an image pixel in a field of view (FOV) generated by the image-capturing device, a corresponding temperature measurement, and a selected device setting. Each emitted radiation of selected regions is detected based on a first image in the FOV. At least one region is determined whether the region is poor responsive, based on the intensity-temperature mapping associated with the device setting. The at least one poor responsive region is replaced with acceptable regions unaffected by the saturation from at least one other image captured at a different device setting for higher temperature resolution.

20 Claims, 4 Drawing Sheets

(51) Int. Cl.
  *G01J 5/60* (2006.01)
  *G06T 5/00* (2006.01)
  *G01J 5/06* (2006.01)

(52) U.S. Cl.
  CPC .......... *G01J 2005/0048* (2013.01); *G01J 2005/0077* (2013.01); *G01J 2005/068* (2013.01); *G06T 2207/10048* (2013.01)

(58) Field of Classification Search
  CPC .......... G01J 2005/068; G01J 5/00; G01J 5/48; G01J 5/50; G01J 5/58; G01J 5/60; G01J 5/026; G06T 7/0024; G06T 7/408; G06T 2207/20208; G06T 2207/10048
  See application file for complete search history.

(56) References Cited

U.S. PATENT DOCUMENTS

| | | | | |
|---|---|---|---|---|
| 5,225,883 A * | 7/1993 | Carter | ............ | F23N 5/085 356/45 |
| 5,368,471 A * | 11/1994 | Kychakoff | ............ | F23N 5/082 110/186 |
| 5,822,222 A * | 10/1998 | Kaplinsky | ............ | G01J 5/60 250/316.1 |
| 6,404,920 B1 * | 6/2002 | Hsu | ............ | G06K 9/00201 382/190 |
| 6,630,670 B2 | 10/2003 | Salisbury et al. | | |
| 6,690,011 B2 * | 2/2004 | Watanabe | ............ | G06K 9/00651 250/330 |
| 7,445,382 B2 * | 11/2008 | Camm | ............ | G01J 5/0003 374/121 |
| 7,734,439 B2 * | 6/2010 | Timans | ............ | G01J 5/0003 702/99 |
| 7,938,576 B1 * | 5/2011 | Kychakoff | ............ | G01J 5/605 374/124 |
| 7,956,326 B1 * | 6/2011 | Kychakoff | ............ | G01N 17/008 250/339.01 |
| 8,094,301 B2 * | 1/2012 | Saveliev | ............ | H04N 5/2252 250/208.1 |
| 8,300,880 B2 * | 10/2012 | Esmaili | ............ | B01J 8/001 374/124 |
| 8,369,563 B2 * | 2/2013 | Zavagli | ............ | G06K 9/3233 382/100 |
| 8,543,357 B1 * | 9/2013 | Marandos | ............ | G01J 5/0003 250/341.8 |
| 8,547,331 B2 | 10/2013 | Warnke et al. | | |
| 9,127,891 B2 * | 9/2015 | Au | ............ | F27D 21/02 |
| 9,196,032 B1 * | 11/2015 | Kraus | ............ | G06T 7/0004 |
| 2002/0126732 A1 * | 9/2002 | Shakouri | ............ | G01J 5/00 374/130 |
| 2003/0123518 A1 * | 7/2003 | Abbasi | ............ | G01J 5/00 374/124 |
| 2012/0113289 A1 * | 5/2012 | Marcu | ............ | G06T 5/50 348/222.1 |
| 2012/0235042 A1 * | 9/2012 | Cole | ............ | G01J 5/0018 250/340 |
| 2012/0257018 A1 | 10/2012 | Shigemura et al. | | |
| 2013/0176458 A1 * | 7/2013 | Van Dalen | ............ | H04N 5/232 348/231.99 |
| 2013/0342680 A1 * | 12/2013 | Zeng | ............ | H04N 5/332 348/135 |
| 2014/0022410 A1 * | 1/2014 | Gish | ............ | H04N 1/60 348/223.1 |
| 2015/0015694 A1 * | 1/2015 | Au | ............ | F27D 21/02 348/83 |
| 2015/0355030 A1 * | 12/2015 | Au | ............ | G01J 5/0044 702/134 |
| 2015/0362371 A1 * | 12/2015 | Au | ............ | G01J 5/0044 348/165 |
| 2015/0362372 A1 * | 12/2015 | Venkatesha | ............ | G01J 5/0044 250/208.1 |
| 2016/0097533 A1 * | 4/2016 | Bietto | ............ | F23N 5/082 431/13 |
| 2016/0097680 A1 * | 4/2016 | Bietto | ............ | F23N 5/082 356/43 |

* cited by examiner

EXTENDED TEMPERATURE RANGE MAPPING PROCESS OF A FURNACE ENCLOSURE USING VARIOUS DEVICE SETTINGS

The present invention relates generally to a process for estimating temperature readings of a furnace enclosure, and more particularly to an intensity to temperature mapping process for estimating a high dynamic temperature range of the furnace enclosure using various device settings of an image-capturing device.

BACKGROUND OF THE INVENTION

Accurately analyzing internal conditions of a furnace is an essential task for an operator to better control temperatures of different regions in a furnace enclosure for producing products more efficiently and saving energy-related costs. Typically, image-capturing devices, such as color cameras, infrared spectrometers, filtered cameras, and the like, are installed in the furnace enclosure for detecting the temperatures of the furnace enclosure. Intensities of image pixels received from the devices have a direct relationship with the temperatures of viewed surfaces inside the furnace.

Such image-capturing devices provide a wide coverage of the furnace enclosure when compared to measurement techniques used by temperature sensors, such as thermal couples and pyrometers. Calibration is performed to establish the relationship between the temperatures and intensities. However, the furnace enclosure has different regions with large variations in surface and volume temperature. For example, certain regions, known as flame regions, are close to a heat source (e.g., a burner), and thus have higher temperatures and higher image pixel intensities when compared to other regions, known as cold regions (e.g., an exhaust area), where the image pixel intensities are relatively lower.

Typically, the regional temperatures of the furnace enclosure can vary depending on locations of the regions. An exemplary temperature value of the cold regions is approximately 300 degree Celsius (or ° C.) or 570 degree Fahrenheit (or ° F.), and for the flame regions, it is approximately 1500° C. or 2700° F. The flame and cold regions can be imaged in the field of view of the same image-capturing device. A dynamic range of each image-capturing device, which describes the ratio between the maximum and minimum measurable light intensities, depends on sensor characteristics of the image-capturing device, which in turn determines the maximum and minimum sensed temperatures and radiance based on different device settings or parameters (e.g., shutter speed, exposure time, aperture and gain).

An image-capturing device with a high dynamic range has a large pixel size (pixel pitch) when compared to a regular camera. The cost of a camera with high dynamic range is also much higher compared to a regular camera. However, even if such image-capturing devices are installed and used in the furnace, captured images may be overexposed in one region and/or underexposed in another region due to large variations in temperature and corresponding radiation. As a result, detailed temperature profiles of the overexposed and/or underexposed regions become undetectable or unmeasurable in excessively bright or dark areas. These regions, herein, are referred to as poor responsive regions. Recovering the detailed temperature profiles of these regions is impossible because a limited number of bits per pixel is insufficient to represent a possible temperature range.

Therefore, there is a need for an improved method of providing detailed temperature profiles of the full furnace region and ensuring that overexposed and underexposed regions of the furnace enclosure do not occur while imaging a combustion process of the furnace.

BRIEF SUMMARY OF THE INVENTION

The present invention is directed to an intensity to temperature mapping process for providing a high dynamic temperature range or profile of the furnace enclosure using various device settings.

An important feature of certain embodiments is that the present process merges multiple temperature images, which are transformed from images taken at different device settings or parameters, such as shutter speed, exposure time, aperture, and gain to achieve high dynamic temperature range outputs. Temperature measurement is often a prerequisite for many optimal industrial controls. This is particularly true in an industrial furnace, which is a large enclosure heated by multiple burners. Temperature sensors, such as thermal couples and pyrometers, are used to measure the temperature of the furnace. However, the temperature sensors can measure only certain areas of the furnace where the sensors are installed, and thus the remaining surfaces and volumes cannot be measured without the sensors.

It is an important task for an operator to effectively perform temperature measurements of the entire furnace for maximum product yield, maximum energy efficiency, and minimum flue gas consumed. An image-capturing device generates a light intensity image of a selected region of the furnace. Transformation of the observed image intensity to a temperature reading is needed.

Typically, an exposure bracketing method is used to provide the high dynamic temperature profile where multiple images at different exposure times are captured and combined. Unlike the exposure bracketing method, the present process utilizes the image-capturing device to capture multiple images using various device settings. In operation, when an amount of emitted radiation at a specific device setting saturates the intensity of an image pixel, the same amount of emitted radiation at another device setting may not saturate the intensity of the image pixel in a corresponding image captured by the image-capturing device. As such, the temperature value of the region corresponding to the pixel location can be estimated using the unsaturated image pixel.

The foregoing and other aspects and features of the present invention will become apparent to those of reasonable skill in the art from the following detailed description, as considered in conjunction with the accompanying drawings.

DETAILED DESCRIPTION OF THE INVENTION

Figure 1:
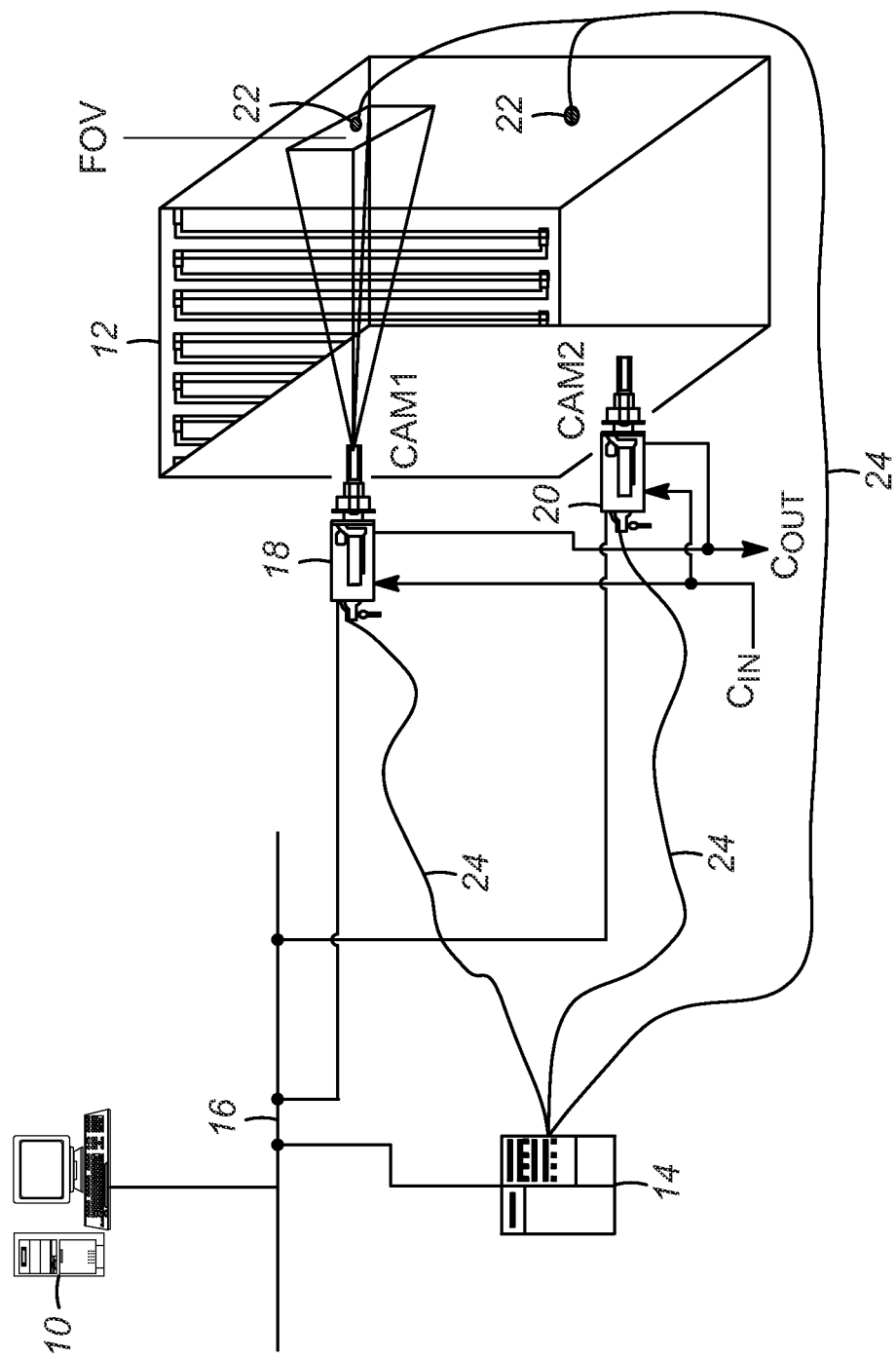
FIG. 1 illustrates an exemplary use of the present process in a camera system configuration.

Referring now to FIG. 1, an exemplary mapping unit 10 using an embodiment of the present process is provided for accurately mapping temperatures of a selected region inside a large scale enclosure 12, such as an industrial furnace. As used herein, the term "unit" may refer to, be part of, or include an Application Specific Integrated Circuit (ASIC), an electronic circuit, a computer processor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present system should not be so limited since other modifications will become apparent to the skilled practitioner.

The mapping unit 10 may reside in or be coupled to a server or computing device 14 (including, e.g., database and video servers), and is programmed to perform tasks and display relevant data for different functional units via a network 16. It is contemplated that other suitable networks can be used, such as a corporate Intranet, a local area network (LAN) or a wide area network (WAN), and the like, using dial-in connections, cable modems, high-speed ISDN lines, and other types of communication methods known in the art. All relevant information can be stored in the databases for retrieval by the mapping unit 10 or the computing device 14 (e.g., as a data storage device and/or a machine readable data storage medium carrying computer programs). Another exemplary mapping unit 10 is disclosed in commonly assigned U.S. patent application Ser. No. 14/306,047, which is incorporated by reference in its entirety.

A plurality of image-capturing devices 18, 20 are mounted around the enclosure 12 (with two devices being shown in this example, but with additional devices being included, if desired). Each of the image-capturing devices 18, 20 captures image sequences covering a selected interior portion or region of the enclosure 12, for which temperature is to be measured. A plurality of temperature sensors 22, such as thermal couples or pyrometers, which are each observable by one or more image-capturing devices 18, 20 are placed inside the enclosure 12. Although only two image-capturing devices 18, 20 and two temperature sensors 22 are shown for illustration purposes, any number of devices and sensors can be used. Alternatively, even a single image-capturing device 18 can be used. Each image-capturing device 18, 20 can be liquid-cooled by directing the inflow of cold coolant $C_{IN}$ to the device, and delivering the outflow of warm coolant $C_{OUT}$ from device to an outlet.

A cable 24 (or other signal transferring means, such as wireless communication) may be used to connect the sensors 22 and the image-capturing devices 18, 20 to the computing device 14, which may also have digitization, storage, and user interface capabilities. The computing device 14 receives temperature outputs or signals from the temperature sensors 22 and image sequences from the image-capturing devices 18, 20 to set proper parameters or settings of the image-capturing devices for performing subsequent intensity-temperature calibration and for estimating the temperature of the selected region of the enclosure 12.

An exemplary calibration and temperature estimation method is disclosed in commonly assigned U.S. patent application Ser. No. 14/296,265, which is incorporated by reference in its entirety. As described in the above '932 application, an intensity of the corresponding image pixel is transformed to the temperature based on device settings of the image-capturing device 18, 20 and the image pixel. Then, this intensity to temperature transformation process performs computation or estimation of the temperatures of image pixels in a field of view (or FOV) of the corresponding image-capturing device 18, 20 by using the intensity-temperature calibration function.

In one embodiment, the temperatures are computed and estimated from a set of intensity images, which are captured by the image-capturing devices 18, 20 that are optimally placed in or in association with the enclosure 12. As shown in FIG. 1, the plurality of image-capturing devices 18, 20 are positioned with respect to the enclosure 12, and the plurality of thermal couples or pyrometers 22 are disposed at selected locations of the enclosure for collecting data. The image-capturing devices 18, 20 may include multi-spectral image-capturing devices that capture images at multiple spectral wavelengths based on the device settings. A long-wave infrared (LWIR) microbolometer with multiple spectral filters is another example of the multi-spectral image-capturing device.

When the amount of emitted radiation at a first predetermined device setting saturates the intensity of an image pixel, the amount of emitted radiation at a second predetermined device setting may not saturate the same image pixel in the corresponding image due to a different device setting. Conversely, if the amount of emitted radiation at the second predetermined device setting is too low or underexposed in the image, the amount of emitted radiation at the first predetermined device setting may provide better image intensities at the same pixel in the image. The mapping unit 10 performs a temperature mapping process or method that substitutes or replaces overexposed or underexposed portions of the image for providing an extended temperature mapping of the furnace enclosure 12.

As explained in greater detail below, if the number of bits per pixel in the image devices 18, 20 is equal to 8, the device can measure $2^8$ (or 256) distinct temperature values (e.g., 0-255). Specifically, when the region is saturated or overexposed, the temperature value is read as 255, and when the region is underexposed, the temperature value is read as zero (0). Thus, the temperature value of each of the overexposed regions is equal to a maximum value (i.e., 255) that is detectable by the image-capturing device, and similarly, the temperature value of each of underexposed regions is equal to a minimum temperature value (i.e., 0) that is detectable by the image-capturing device, regardless of the fact that the regions may have different temperature values in reality. More detailed descriptions of certain features of the present mapping process are provided below.

Figure 2:
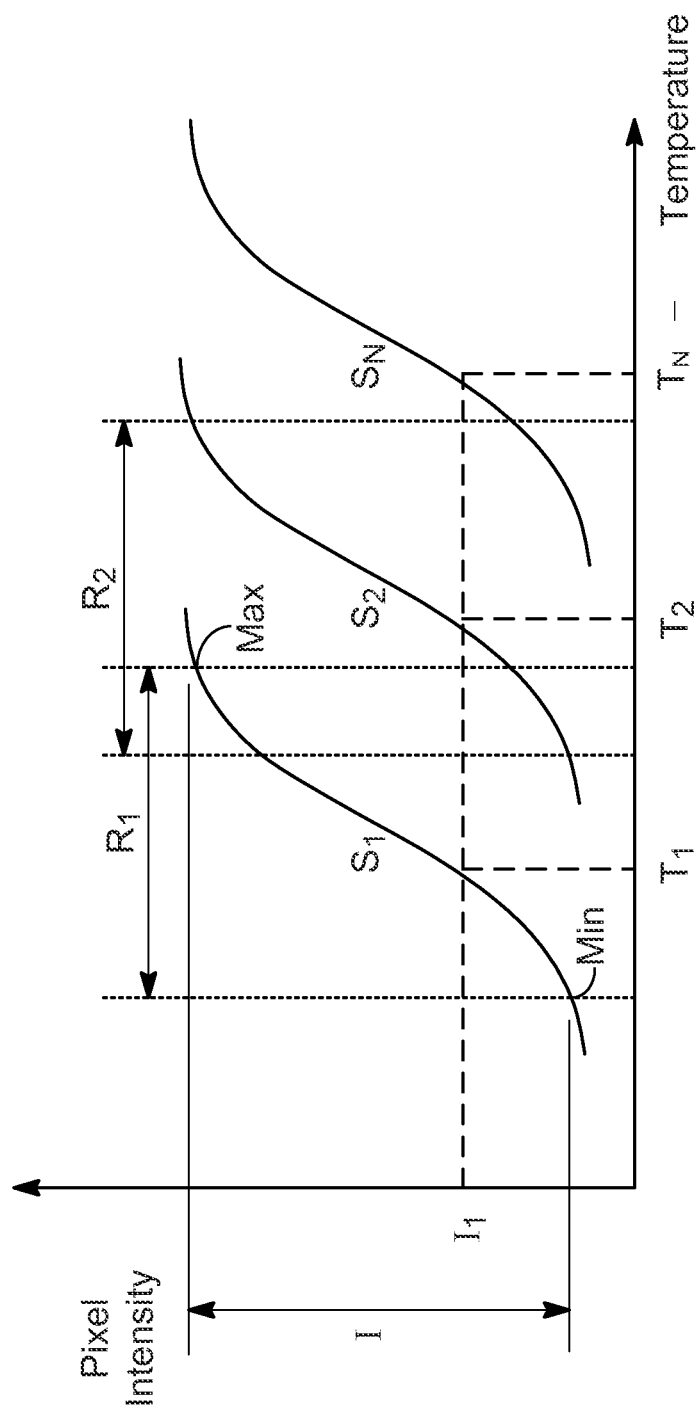
FIG. 2 is a graphical representation of intensity responses as a function of temperature and device settings in accordance with an embodiment of the present disclosure.
Figure 3:
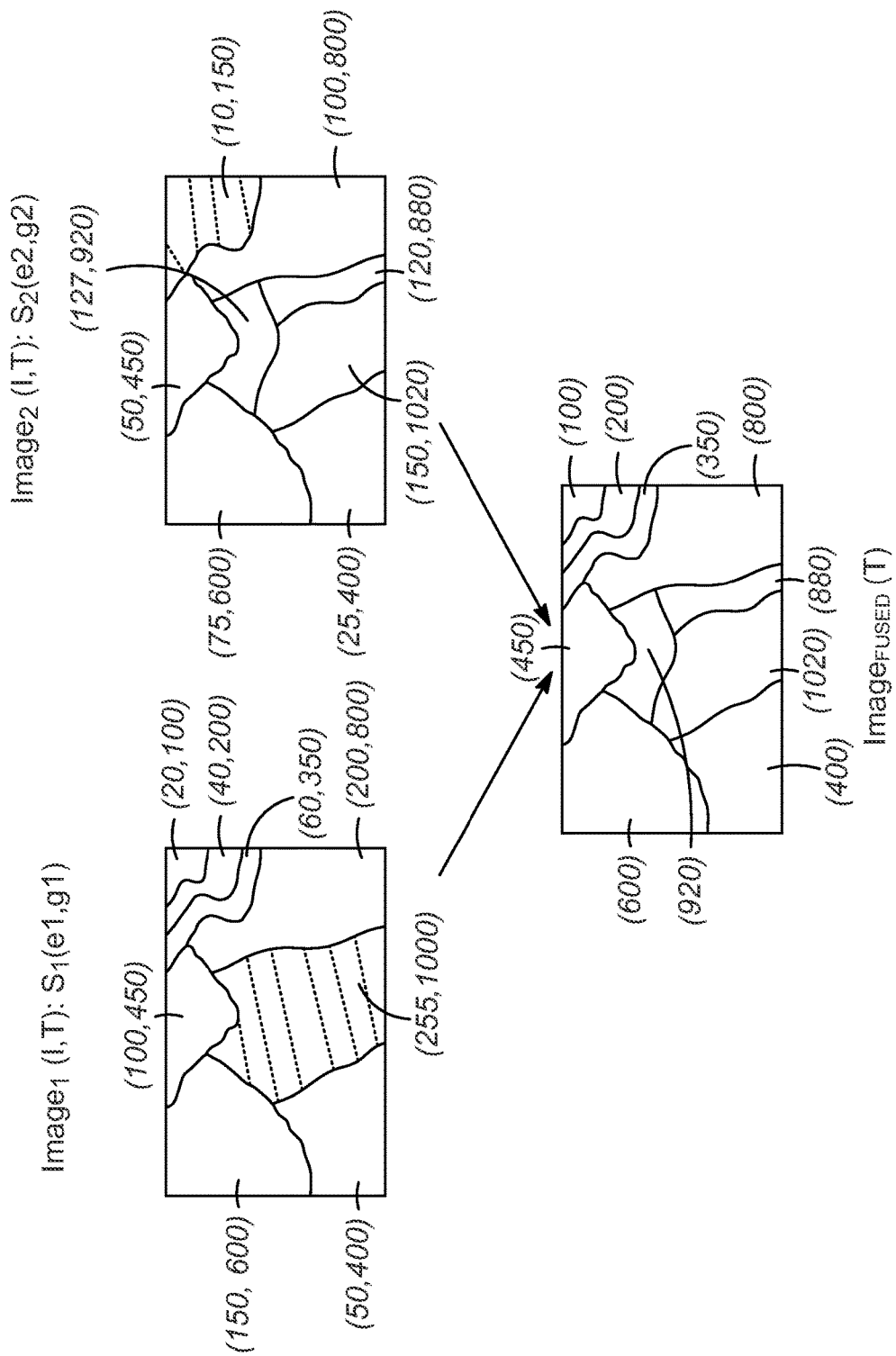
FIG. 3 illustrates an exemplary temperature mapping method in accordance with an embodiment of the present disclosure.
Figure 4:
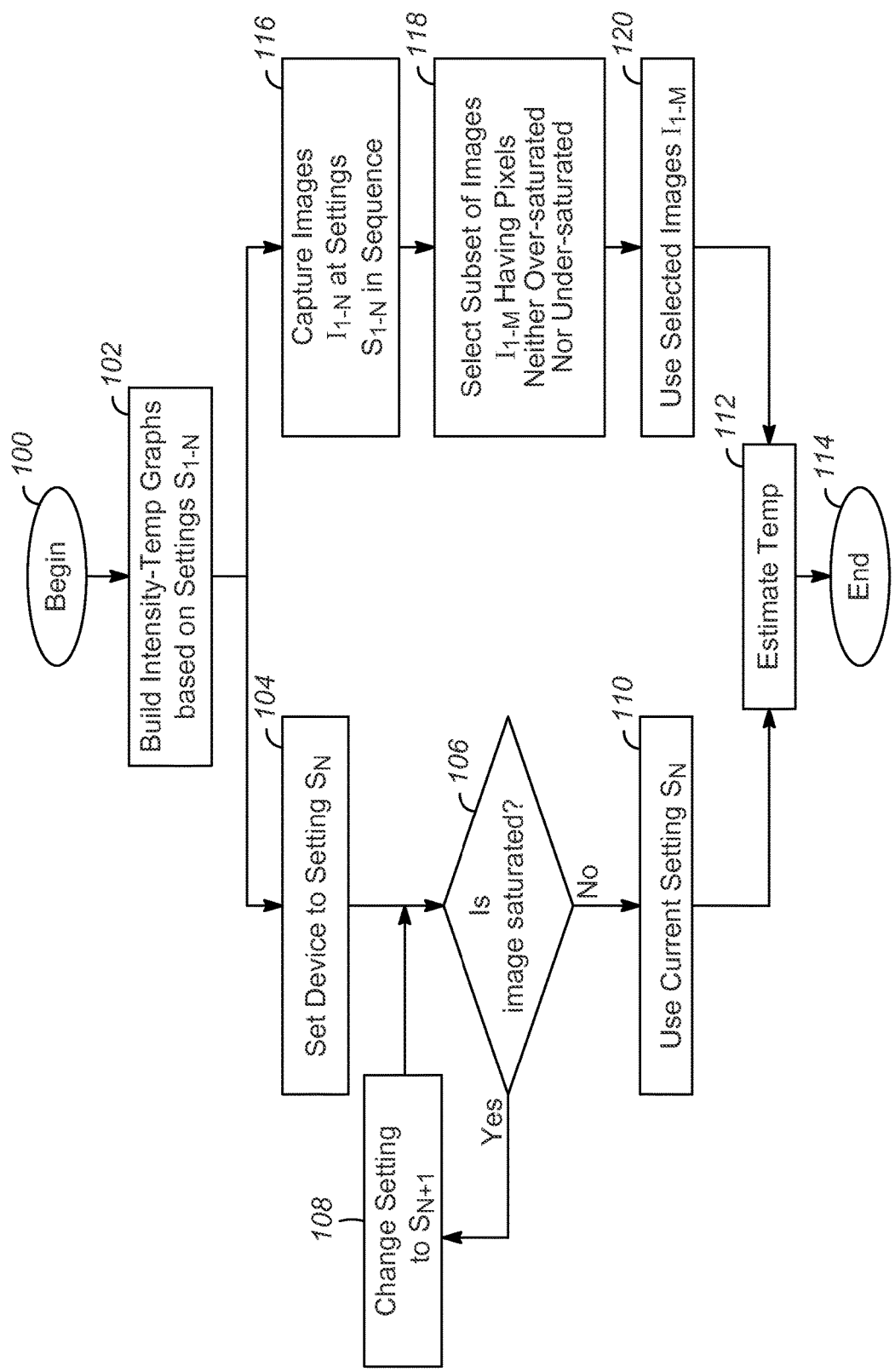
FIG. 4 is a flowchart of an exemplary temperature mapping method in accordance with an embodiment of the present disclosure.

Referring now to FIGS. 2-4, an explanation will be provided of how the mapping unit 10, of this embodiment, provides an intensity to temperature mapping method for providing an extended temperature mapping of all regions of the furnace enclosure 12. Typically, the temperature of the combustion process can reach up to 2500 degree Fahrenheit (or ° F.) or 1400 degree Celsius (or ° C.). To cover an entire temperature range (e.g., 0-2500° F. or 0-1400° C.), the device parameters or settings, such as aperture, shutter speed, exposure time, and gain can be selectively set and adjusted. Thus, various intensity-temperature calibration functions can be established based on specific device settings.

FIG. 2 shows a graphical representation of temperature, T, as a function of image pixel intensity, I, at various device settings, $S_i$. Each intensity-temperature function of an image-capturing device 18 can be calibrated at different device settings $S_1$, $S_2$. Thus, each device setting $S_1$, $S_2$ offers optimal responses to a temperature range $R_1$, $R_2$. As such, the first temperature range $R_1$ represents a valid range of temperatures for the first predetermined device setting $S_1$, and similarly, the temperature range $R_2$ represents a valid range of temperatures for the second predetermined device setting $S_2$. An important aspect of the graphical representation is that the same pixel intensity $I_1$ can correspond to different temperature values $T_1$, $T_2$, $T_N$ based on a selected device setting $S_1$, $S_2$, or $S_N$. For example, the intensity of 100 units may represent the temperature values of 800, 1200, and 1800° F. (or 430, 650, and 980° C.) in three different images taken at device settings $S_1$, $S_2$, or $S_N$, respectively. An exemplary pixel intensity I may be defined as provided by expression 1.

$$T=f\{I,S\} \quad (1)$$

In this example, considering an 8-bit image capturing device, when the first image-capturing device 18 is set to detect the emitted radiation at the first predetermined device setting $S_1$, the measurable temperature range $R_1$ may be between 500-1100° F. (or 260-600° C.), wherein the minimum temperature value MIN of 500° F. is read as zero (0) pixel intensity, and the maximum temperature value MAX of 1100° F. is read as 255. Thus, certain regions of the furnace enclosure 12 having temperatures lower than 500° F. are underexposed and still read as 0, and other regions having temperatures higher than 1100° F. are saturated or overexposed and also read as 255. A first graph designated $S_1$ represents the intensity-temperature relationship associated with the first predetermined device setting $S_1$.

Similarly, when the same image-capturing device 18 is set to detect the emitted radiation at the second predetermined device setting $S_2$, the measurable temperature range $R_2$, for this example, may be between 1000-1600° F. (or 530-900° C.), wherein the minimum temperature value of 1000° F. is read as zero (0), and the maximum temperature value of 1600° F. is read as 255. Thus, certain regions of the furnace enclosure 12 having temperatures lower than 1000° F. are underexposed and read as 0, and other regions having temperatures higher than 1600° F. are saturated or overexposed and read as 255. A second graph designated $S_2$ represents the intensity-temperature relationship associated with the second predetermined device setting $S_2$. A shared area between two graphs $S_1$, $S_2$ represents a common temperature range (i.e., 1000-1100° F. or 530-600° C.) where either one of the graphs can be used to estimate identical temperature values. The temperature estimates in this common temperature range can also be used to improve the accuracy of the estimated temperature as part of the calibration process. Detailed explanation can be found in U.S. patent application Ser. No. 14/296,286.

Likewise, when the same image-capturing device 18 is set to detect the emitted radiation at the third predetermined device setting $S_N$, the measurable temperature range, for this example, may be between 1500-2500° F. (or 810-1400° C.), wherein the minimum temperature value of 1500° F. is read as zero (0), and the maximum temperature value of 2500° F. is read as 255. Thus, certain regions of the furnace enclosure 12 having temperatures lower than 1500° F. are underexposed and read as 0, and other regions having temperatures higher than 2500° F. are saturated or overexposed and read as 255. A third graph designated $S_N$ represents the intensity-temperature relationship associated with the third predetermined device setting $S_N$.

As a result, by merging or coalescing the these graphs $S_1$, $S_2$, and $S_N$, an extended temperature profile covering the temperature range of 500-2500° F. (or 260-1400° C.) is achieved from the different images captured using different device setting. Of course, other temperature ranges than those provided in this example for each image-capturing device viewing other regions of the furnace enclosure 12 are also contemplated. Preferably, each temperature range overlaps at least one of the other temperature ranges such as where the upper endpoint of the first range and the lower endpoint of the second range overlap by 100° F., and the upper endpoint of the second range and the lower endpoint of the third range also overlap by 100° F. Other overlap amounts besides 100° F. are also contemplated, and it is also contemplated that different overlap amounts could be used between each of the various temperature ranges.

Referring now to FIG. 3, an exemplary temperature mapping method is illustrated that substitutes or replaces overexposed or underexposed portions of the images with portions unaffected by the overexposure or underexposure from other images captured by using different device settings, thereby providing an extended temperature mapping of the furnace enclosure 12. In one embodiment, the mapping unit 10 selects various, distinct predetermined device settings $S_1$, $S_2$ for detecting different temperature ranges $R_1$, $R_2$ of the same FOV. In this example, the first image-capturing device 18 is set at the first predetermined device setting $S_1$ having the exposure time e1 and the gain g1. A first image IMAGE1 captured by the first image-capturing device 18 using the setting $S_1$ (e1, g1) shows various temperature regions based on a pair of the observed pixel intensity and the corresponding temperature values (I, T). A certain portion of the temperature region has a distinct intensity-temperature value. As an example, (I=150, T=600) represents the intensity of 150 and the temperature value of 600° F. (or 316° C.).

When the mapping unit 10 identifies one or more saturated (or alternatively, underexposed) regions in the first image IMAGE1 based on the corresponding temperature values of the regions, the saturated (or alternatively, underexposed) regions are substituted or replaced by additional acceptable regions from other images having a substantially identical FOV. The term "acceptable regions" refers to the regions that are neither overexposed nor underexposed, whereas the term "poor responsive regions" refers to the regions that are either overexposed or underexposed. For example, if one or more regions of IMAGE1 (indicated by the broken lines) having the same intensity-temperature value (255, 1000) are saturated and read as 255, then the mapping unit 10 will retrieve the corresponding regions in other images that share substantially the same FOV.

A second image IMAGE2 captured by the same image-capturing device 18 using the setting $S_2$ (e2, g2) shows various temperature regions based on the pair of the observed pixel intensity and the corresponding temperature (I, T) as in the first image IMAGE1 having substantially the same FOV. However, because the second image is captured with the second predetermined device setting $S_2$ and thus is capable of detecting a different temperature range than that of the first image, the regions in IMAGE1 having the intensity-temperature value (255, 1000) are not saturated in the second image IMAGE2. The mapping unit 10 creates sub-regions having different intensity-temperature values of the unsaturated regions in the second image IMAGE2, designated (127, 920), (150, 1020), and (120, 880), and selects or flags the unsaturated regions as the additional acceptable regions.

Similarly, the temperature mapping method can be performed for the underexposed regions by the mapping unit 10 to obtain better temperature resolution in the low temperature range (e.g., 100-500° F.). For example, the regions in IMAGE2 (indicated by the broken lines) having the intensity-temperature value (10, 150) can be replaced with the regions in the first image IMAGE1, designated (20, 100), (40, 200), and (60, 350) due to the regions not undersaturated in IMAGE1. As such, the temperature mapping method can be iteratively performed for the poor responsive regions by the mapping unit 10 to obtain better temperature resolution in the low (e.g., below 500° F. or 260° C.) and high (e.g., above 2500° F. or 1400° C.) temperature ranges.

Accordingly, a combined image $IMAGE_{FUSED}$ is generated by combining acceptable or valid regions of the first and second images IMAGE1, IMAGE2, by complementarily replacing or substituting the overexposed or underexposed regions in $IMAGE_1$ and $IMAGE_2$. In a preferred embodiment, the temperature values are combined for the fused image $IMAGE_{FUSED}$. The intensity of a particular pixel in the combined image $IMAGE_{FUSED}$ is derived from the corresponding intensity of image pixel in the first and second images $IMAGE_1$, $IMAGE_2$ captured at two different gain and exposure settings $S_1$ (e1, g1), $S_2$ (e2, g2) using the corresponding intensity to temperature mapping functions. The resulting $IMAGE_3$ can be used for display purposes. Thus, the intensity values and the device settings associated with the first and second images $IMAGE_1$, $IMAGE_2$ are different and may not be combined directly in the fused image $IMAGE_{FUSED}$.

Original or initial images $IMAGE_1$, $IMAGE_2$ are selected such that the chosen pixels are neither oversaturated nor underexposed. When a multispectral imager is used, the pixels should be valid in all channels. An important aspect of the present process is that although the original images $IMAGE_1$, $IMAGE_2$ may have an 8 or 12 bit per pixel resolution, the resulting image $IMAGE_{FUSED}$ may be converted to a higher bit depth (e.g., 16 bits per pixel resolution) to retain the dynamic range captured from multiple images IMAGE1, IMAGE2. As a result, the present process increases the dynamic range of temperature measurement, and further increases the accuracy of the initial images $IMAGE_1$, $IMAGE_2$. The final temperature measurements shown in $IMAGE_{FUSED}$ have higher precision as they are derived from multiple images $IMAGE_1$, $IMAGE_2$ when compared to other conventional methods.

During operation, a low-cost 8-bit camera may be used instead of cameras with high bits per pixel resolution. The accuracy of the detected temperature readings is substantially improved as the same FOV is captured at different exposure and gain settings, by merging the temperature estimates from valid regions from images $IMAGE_1$, $IMAGE_2$. More than two images including an N-th image $IMAGE_N$ can be used to complement offset errors. Transient errors caused by the dynamic nature of the flame are also reduced by averaging temperatures across valid regions of the images, $IMAGE_1$, $IMAGE_2$, . . . , $IMAGE_N$, which are taken within a small time window.

Referring now to FIG. 4, an exemplary method of executing the mapping process or method is shown using the mapping unit 10. Although the following steps are primarily described with respect to the embodiment of FIGS. 1-3, it should be understood that the steps within the method may be modified and executed in a different order or sequence without altering the principles of the present disclosure.

The method begins at step 100. In step 102, as illustrated in FIG. 2, the mapping unit 10 builds at least one intensity-temperature graphical relationship of the image pixel intensity I based on the temperature values T and the predetermined device settings $S_1$, $S_2$, or $S_N$. As mentioned above, during the intensity-temperature calibration process, the intensity I of the corresponding image pixel is transformed to the temperature T based on the device settings $S_1$, $S_2$ or $S_N$ of the image-capturing device 18, 20 and the image pixel. This calibration process may be performed either off-line using a black body, or on-line in the furnace, establishing the intensity-temperature relationships at various, different device settings $S_1$, $S_2$, or $S_N$, which are then preferably saved on the data storage device in the server 14.

A polynomial regression method is preferably performed to the intensity-temperature mapping functions of the selected regions in the FOV of the corresponding image-capturing device 18, 20. The polynomial regression method is done by performing a least square error or approximation. An exemplary polynomial regression method is disclosed in commonly assigned U.S. patent application Ser. No. 14/296, 286, which is incorporated by reference in its entirety.

Further the process of high dynamic range temperature estimation can follow either the path from step 104 to step 112 or the path from step 116 to step 112 as an alternate method.

In step 104, the mapping unit 10 selects the first predetermined device setting $S_1$, and sets the first image-capturing device 18 to the selected device setting $S_1$ based on an image analysis. It is also contemplated that the mapping unit 10 may select any one of the predetermined device settings $S_1$, $S_2$, or $S_N$ as an initial device setting. Similarly, the mapping unit 10 may initially set any one of the available image-capturing devices 18, 20 to the selected device setting to suit different applications. An exemplary image analysis is performed by the mapping unit 10 based on a predetermined percentage of acceptable regions in the image captured by the image-capturing device 18, 20. For example, when a certain percentage (e.g., 20%) of the image is over-saturated or certain regions of interest are over-saturated (e.g., near the burner area), the image-capturing device 18 automatically switches to a different device setting (e.g., $S_2$) such that the unacceptable regions are not over-saturated.

More specifically, in step 106, when the mapping unit 10 determines that the image is over-saturated based on the image analysis, control proceeds to step 108. Otherwise, control proceeds to step 110.

In step 108, the mapping unit 10 changes the current device setting $S_1$ of the first image-capturing device 18 to the next available device setting $S_2$. During this acquisition time, the mapping unit 10 receives the new device setting $S_2$ (e2, g2) from the data storage device, which was previously saved during the calibration process.

In step 110, when the new device setting $S_2$ is determined to be acceptable (i.e., the image taken using the new setting $S_2$ is not saturated), the image-capturing device 18 maintains and uses the currently selected device setting $S_2$ for capturing subsequent images.

In step 112, as illustrated in FIG. 3, the mapping unit 10 estimates the temperature values of the saturated regions by combining acceptable or valid regions that are unaffected by the overexposure or underexposure from other images captured by the image-capturing device 18 at the different device setting $S_2$.

Control may end at step 114. However, in step 102, control may simultaneously or alternatively, proceed to step 116 to suit a different application. In step 116, the mapping unit 10 sequentially captures a predetermined number of images at different device settings (e.g., $IMAGE_1$ at $S_1$, $IMAGE_2$ at $S_2$, and $IMAGE_N$ at $S_N$, where N is an integer). These images are usually obtained in quick succession to minimize the change in the furnace and/or heat distribution. For example, the mapping unit 10 selects a set of device settings for different aperture, gain and exposure values from the preset settings that were saved from the calibration process, and captures a sequence of images of the furnace enclosure 12 with each available device setting $S_1$, $S_2$, and $S_N$. If mean temperature in the furnace enclosure 12 is known based on prior estimates and/or thermal couple readings in the current field of view, the mapping unit 10 may select a subset of preset device settings $[S_K \ldots S_{K+n}]$. These preset settings are based on the minimum and maximum recorded temperatures of the furnace, so that the images captured at these settings capture the full range of temperatures (i.e. from a minimum temperature to a maximum temperature). In step 118, as illustrated in FIG. 3, the mapping unit 10 selects a subset of acceptable or valid images $IMAGE_{1-M}$, where M<=N, from the set of images taken in step 116 (i.e., $IMAGE_{1-N}$). The selected subset of images $IMAGE_{1-M}$ has image pixels that are neither oversaturated (or overexposed) nor under-saturated (or underexposed).

In step 120, when the subset of images $IMAGE_{1-M}$ are determined to be acceptable (i.e., not saturated), the image-capturing device 18 maintains and uses the current subset of images for estimating the temperature values. Control proceeds to step 112 and ends at step 114.

While a particular embodiment of the present mapping process has been described herein, it will be appreciated by those skilled in the art that changes and modifications may be made thereto without departing from the invention in its broader aspects and as set forth in the following claims.

What is claimed is:

1. A process for mapping temperatures in an enclosure during a combustion process, comprising:
providing a device setting for an image-capturing device;
generating an intensity-temperature mapping by performing an intensity-temperature calibration based on an intensity of an image pixel in a field of view (FOV) generated by the image-capturing device, a corresponding temperature measurement, and the device setting of the image-capturing device;
detecting an amount of emitted radiation of selected regions within the enclosure based on a first image in the FOV captured by the image-capturing device at the device setting;
determining whether at least one region of said selected regions is poor responsive, which is underexposed or overexposed, such that an accurate temperature is unable to be estimated based on the intensity-temperature mapping associated with the device setting; and
replacing, using a computer processor, temperatures of the at least one poor responsive region with temperatures from acceptable regions unaffected by a saturation from at least one other image in the FOV captured at a different device setting in order to provide an extended temperature mapping of the enclosure, wherein the extended temperature mapping has higher temperature resolution and range than that associated with the first image in the FOV.

2. The process according to claim 1, further comprising:
providing a plurality of predetermined device settings;
changing the device setting of the image-capturing device to a different predetermined device setting when the at least one portion of each selected region is poor responsive; and
maintaining the device setting of the image-capturing device when the temperature is free of poor response.

3. The process according to claim 1, further comprising:
providing a plurality of predetermined device settings;
sequentially capturing a predetermined number of images at different predetermined device settings; and
selecting a subset of acceptable images from the captured images at the different predetermined device settings for substituting the poor responsive regions of the first image with corresponding regions of the selected subset of acceptable images.

4. The process according to claim 1, further comprising:
partitioning the first image captured by the image-capturing device based on the temperatures from the intensity-temperature mapping; and
identifying the poor responsive regions of the first image for which an accurate temperature is unable to be estimated for replacement.

5. The process according to claim 1, further comprising:
generating a plurality of images for the same FOV based on different device settings; and
retrieving corresponding regions of the first image from the at least one other image that shares substantially the same FOV.

6. The process according to claim 5, further comprising:
detecting a different temperature range of the selected regions of the first image based on the device settings; and
creating sub-regions of the selected regions based on the corresponding intensity-temperature mapping.

7. The process according to claim 6, further comprising:
searching for the at least one other image having regions unaffected by poor responsiveness for the higher temperature resolution; and
selecting the acceptable portions unaffected by the poor responsiveness from the at least one other image based on the temperature values.

8. The process according to claim 7, further comprising:
determining which portions of the acceptable regions have higher temperature resolutions based on the temperature values; and
substituting at least one portion of the poor responsive regions with the portions of the acceptable regions for obtaining better temperature resolution in a predetermined temperature range.

9. An apparatus for mapping temperatures in an enclosure, the apparatus comprising:
a mapping unit configured for:
providing a device setting for an image-capturing device;
generating an intensity-temperature mapping by performing an intensity-temperature calibration based on an intensity of an image pixel in a field of view (FOV) generated by the image-capturing device, a corresponding temperature measurement, and the device setting of the image-capturing device;
detecting an amount of emitted radiation of selected regions within the enclosure based on a first image in the FOV captured by the image-capturing device at the device setting;
determining whether at least one region of said selected regions is poor responsive, which is underexposed or overexposed, such that an accurate temperature is unable to be estimated based on the intensity-temperature mapping associated with the device setting; and
replacing, using a computer processor, temperatures of the at least one poor responsive region with temperatures from acceptable regions unaffected by a saturation from at least one other image in the FOV captured at a different device setting in order to provide an extended temperature mapping of the enclosure, wherein the extended temperature mapping has higher temperature resolution and range than that associated with the first image in the FOV.

10. The apparatus according to claim 9, wherein the mapping unit is configured for:
  providing a plurality of predetermined device settings;
  changing the device setting of the image-capturing device to a different predetermined device setting when the at least one portion of each selected region is poor responsive; and
  maintaining the device setting of the image-capturing device when the temperature is free of poor response.

11. The apparatus according to claim 9, wherein the mapping unit is configured for:
  providing a plurality of predetermined device settings;
  sequentially capturing a predetermined number of images at different predetermined device settings; and
  selecting a subset of acceptable images from the captured images at the different predetermined device settings for substituting the poor responsive regions of the first image with corresponding regions of the selected subset of acceptable images.

12. The apparatus according to claim 9, wherein the mapping unit is configured for:
  partitioning the first image captured by the image-capturing device based on the temperatures from the intensity-temperature mapping; and
  identifying the poor responsive regions of the first image for which an accurate temperature is unable to be estimated for replacement.

13. The apparatus according to claim 9, wherein the mapping unit is configured for:
  generating a plurality of images for the same FOV based on different device settings; and
  retrieving corresponding regions of the first image from the at least one other image that shares substantially the same FOV.

14. The apparatus according to claim 9, wherein the mapping unit is configured for:
  detecting a different temperature range of the selected regions of the first image based on the device settings; and
  creating sub-regions of the selected regions based on the corresponding intensity-temperature mapping.

15. The apparatus according to claim 9, wherein the mapping unit is configured for:
  searching for the at least one other image having regions unaffected by poor responsiveness for the higher temperature resolution;
  selecting the acceptable portions unaffected by the poor responsiveness from the at least one other image based on the temperature values;
  determining which portions of the acceptable regions have higher temperature resolutions based on the temperature values; and
  substituting at least one portion of the poor responsive regions with the portions of the acceptable regions for obtaining better temperature resolution in a predetermined temperature range.

16. A non-transitory computer-readable medium storing instructions executable by a computer processor to map temperatures in an enclosure during a combustion process, comprising instructions to:
  provide a device setting for an image-capturing device;
  generate an intensity-temperature mapping by performing an intensity-temperature calibration based on an intensity of an image pixel in a field of view (FOV) generated by the image-capturing device, a corresponding temperature measurement, and the device setting of the image-capturing device;
  detect an amount of emitted radiation of selected regions within the enclosure based on a first image in the FOV captured by the image-capturing device at a particular device setting;
  determine whether at least one region of said selected regions is poor responsive, which is underexposed or overexposed, such that an accurate temperature is unable to be estimated based on the intensity-temperature mapping associated with the device setting; and
  replace, using a computer processor, temperatures of the at least one poor responsive region with temperatures from acceptable regions unaffected by the saturation from at least one other image captured at a different device setting in order to provide an extended temperature mapping of the enclosure, wherein the extended temperature mapping has higher temperature resolution and range than that associated with the first image in the FOV.

17. The medium according to claim 16, further comprising instructions to:
  provide a plurality of predetermined device settings;
  change the device setting of the image-capturing device to a different predetermined device setting when the at least one portion of each selected region is poor responsive; and
  maintain the device setting of the image-capturing device when the temperature is free of poor response.

18. The medium according to claim 16, further comprising instructions to:
  provide a plurality of predetermined device settings;
  sequentially capture a predetermined number of images at different predetermined device settings; and
  select a subset of acceptable images from the captured images at the different predetermined device settings for substituting the poor responsive regions of the first image with corresponding regions of the selected subset of acceptable images.

19. The medium according to claim 16, further comprising instructions to:
  partition the first image captured by the image-capturing device based on the temperatures from the intensity-temperature mapping;
  identify the poor responsive regions of the first image for which an accurate temperature is unable to be estimated for replacement;
  generate a plurality of images for the same FOV based on different device settings; and
  retrieve corresponding regions of the first image from the at least one other image that shares substantially the same FOV.

20. The medium according to claim 16, further comprising instructions to:
  detect a different temperature range of the selected regions of the first image based on the device settings;
  create sub-regions of the selected regions based on the corresponding intensity-temperature mapping;
  search for the at least one other image having regions unaffected by poor responsiveness for the higher temperature resolution;
  select the acceptable portions unaffected by the poor responsiveness from the at least one other image based on the temperature values;
  determine which portions of the acceptable regions have higher temperature resolutions based on the temperature values; and substitute at least one portion of the poor responsive regions with the portions of the acceptable regions for obtaining better temperature resolution in a predetermined temperature range.

* * * * *